(12) United States Patent
Logsdon et al.

(10) Patent No.: US 7,043,319 B1
(45) Date of Patent: *May 9, 2006

(54) SYSTEM AND METHOD FOR VISUALIZING THE USE OF RESOURCES IN A PROCESS SYSTEM

(75) Inventors: George Logsdon, Arlington, TX (US); Gary Elmore, Arlington, TX (US); Avelito Hernal, Arlington, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 10/674,873

(22) Filed: Sep. 30, 2003

(51) Int. Cl.
*G06F 19/00* (2006.01)

(52) U.S. Cl. .................. 700/100; 700/99; 700/121; 705/8

(58) Field of Classification Search ............. 700/100, 700/103, 104, 121, 99; 705/8, 9, 11
See application file for complete search history.

(56) References Cited

U.S. PATENT DOCUMENTS

| | | | | |
|---|---|---|---|---|
| 4,924,386 A | * | 5/1990 | Freedman et al. ............. 705/8 |
| 5,291,394 A | * | 3/1994 | Chapman ...................... 705/8 |
| 5,616,208 A | * | 4/1997 | Lee ....................... 156/345.24 |
| 5,649,113 A | * | 7/1997 | Zhu et al. ...................... 705/7 |
| 5,745,652 A | * | 4/1998 | Bigus ........................... 706/14 |
| 5,746,512 A | * | 5/1998 | Yao et al. ..................... 374/45 |
| 5,754,179 A | * | 5/1998 | Hocker et al. .............. 715/835 |
| 5,839,934 A | * | 11/1998 | Hattori ........................ 445/24 |
| 5,946,212 A | * | 8/1999 | Bermon et al. ................ 700/97 |
| 6,161,054 A | * | 12/2000 | Rosenthal et al. ........... 700/121 |
| 6,197,702 B1 | * | 3/2001 | Tanabe et al. ............... 438/773 |
| 6,256,549 B1 | * | 7/2001 | Romero et al. ............. 700/121 |
| 6,306,740 B1 | * | 10/2001 | Hattori ........................ 438/584 |
| 6,470,227 B1 | * | 10/2002 | Rangachari et al. ........... 700/95 |
| 6,546,364 B1 | * | 4/2003 | Smirnov et al. .............. 703/22 |
| 6,591,153 B1 | * | 7/2003 | Crampton et al. .......... 700/103 |
| 6,615,092 B1 | * | 9/2003 | Bickley et al. ............... 700/99 |
| 6,625,577 B1 | * | 9/2003 | Jameson ........................ 705/8 |
| 6,732,006 B1 | * | 5/2004 | Haanstra et al. ............ 700/121 |
| 6,763,277 B1 | * | 7/2004 | Allen et al. ................. 700/100 |
| 2003/0200130 A1 | * | 10/2003 | Kall et al. ..................... 705/8 |
| 2004/0012637 A1 | * | 1/2004 | Alford et al. ............... 345/772 |
| 2005/0047338 A1 | * | 3/2005 | Hoffman et al. ............ 370/230 |

* cited by examiner

*Primary Examiner*—Paul Rodriguez

(57) ABSTRACT

A resource allocator allocates a plurality of resources among a plurality of tasks within a process system. The resource allocator includes a monitoring controller for monitoring one or more characteristics associated with at least one application process, the resources, and the tasks. The resource allocator also includes a model of the process system representing mathematically the resources and the tasks and defining relationships among related resources and tasks. The resource allocator further includes a resource allocation controller for operating the model in response to the monitored characteristics and allocating the resources among the tasks. In addition, the resource allocator includes a graphical user interface for identifying the resources and flows between at least some of the resources. The graphical user interface includes at least one virtual queue associated with at least one of the resources and identifying one or more items to be processed by the at least one resource.

26 Claims, 7 Drawing Sheets

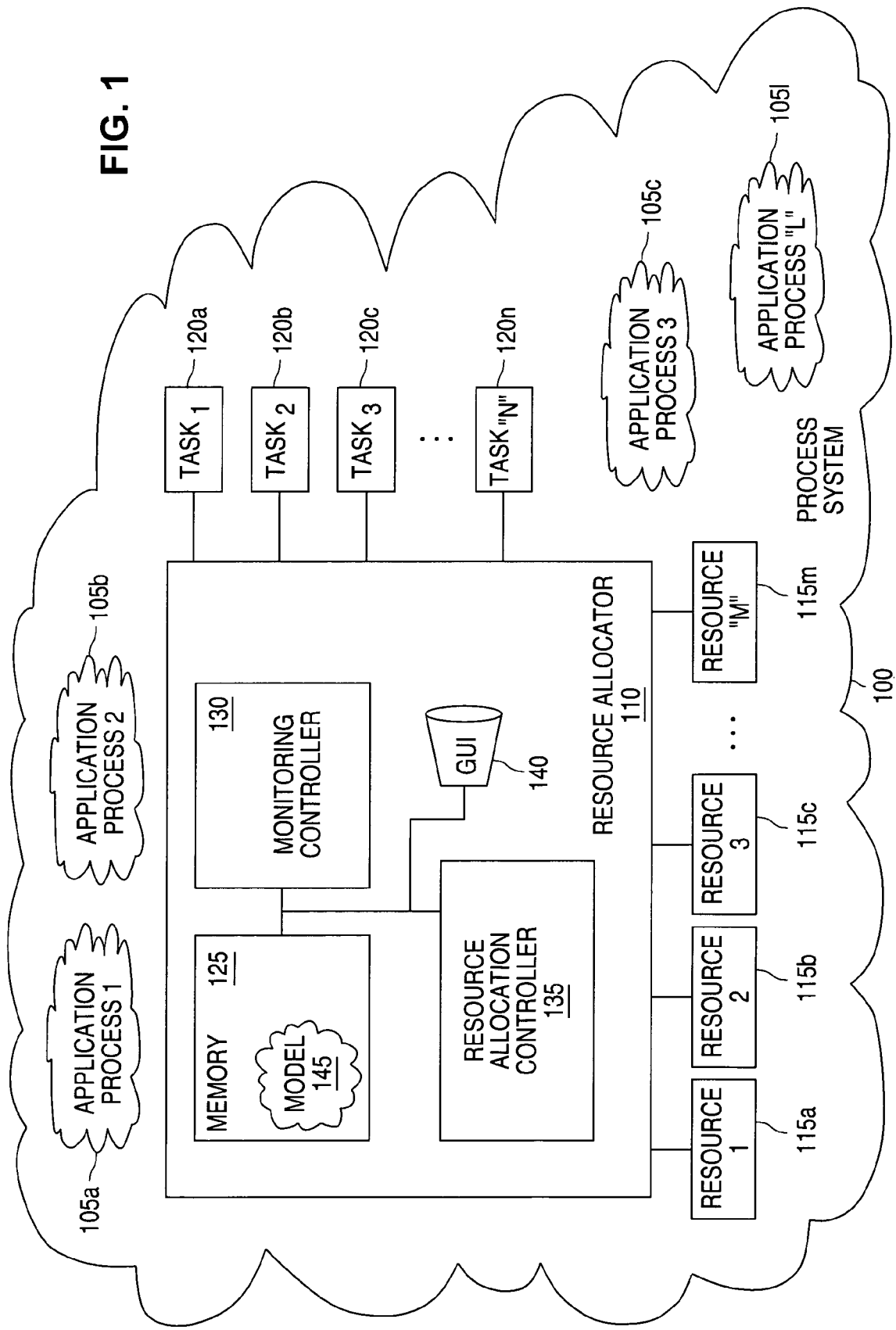

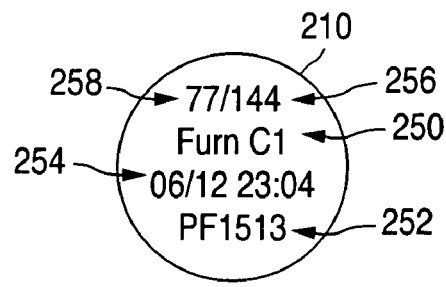
FIG. 2B
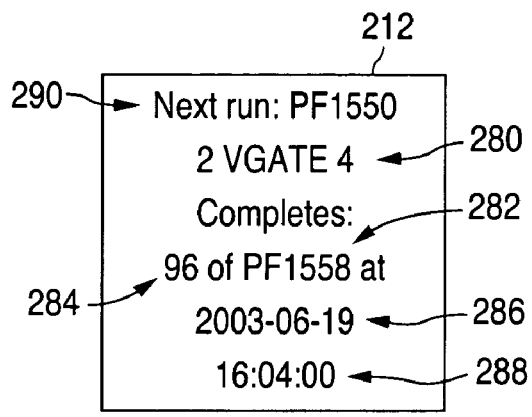
FIG. 2C
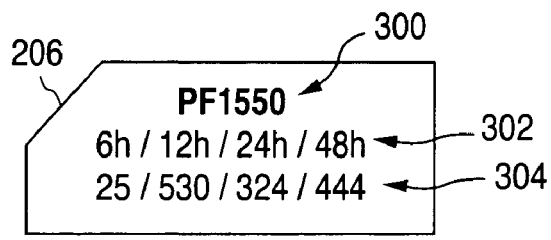
FIG. 3A
| | Recipe | Wafer Count | Expiration | |
|---|---|---|---|---|
| 402a | PF 1513 | 26 | 2003-06-11 | 18:30:00 |
| 402b | PF 1550 | 142 | 2003-06-11 | 18:47:00 |
| 402c | PF 1558 | 96 | 2003-06-11 | 19:02:00 |
| 402d | PF 1513 | 70 | 2003-06-11 | 19:28:00 |
FIG. 4A

| | A | B | C | D | E | F | G | H | I | J | K | L |
|---|---|---|---|---|---|---|---|---|---|---|---|---|
| 1 | Vpoly_recipe | lot_number | Wafers | Cum_PF | PRIORITY_CLASS | ops_2_Vpoly | time_2_poly | Active | owning_entity | Current_Op | Current_op_desc | Current_Quad |
| 2 | PF1550 | CD0906TW | 25 | 25 | WSG STOCK OUT | 0 | 0 | QUEUE | | 2800 | POLY DEP | DIFFUSION |
| 3 | PF1550 | E00402DB | 24 | 49 | 12.4 hrs BEHIND | 1 | 2:59:58 | ACTIVE | FURN C4 | 1875 | SAC OX | DIFFUSION |
| 4 | PF1550 | E00402KD | 12 | 61 | 2.2 days BEHIND | 1 | 2:59:58 | ACTIVE | FURN C4 | 1875 | SAC OX | DIFFUSION |
| 5 | PF1550 | E004024F | 12 | 73 | 1.2 days BEHIND | 1 | 2:59:58 | ACTIVE | FURN C4 | 1875 | SAC OX | DIFFUSION |
| 6 | PF1550 | E004024Z | 24 | 97 | 1.2 days BEHIND | 1 | 2:59:58 | ACTIVE | FURN C4 | 1875 | SAC OX | DIFFUSION |
| 7 | PF1550 | E00402EF | 24 | 121 | 4.9 hrs BEHIND | 1 | 2:59:58 | ACTIVE | FURN C4 | 1875 | SAC OX | DIFFUSION |
| 8 | PF1550 | E00402EH | 24 | 145 | 4.9 hrs BEHIND | 1 | 2:59:58 | ACTIVE | FURN C4 | 1875 | SAC OX | DIFFUSION |
| 9 | PF1550 | E00402EJ | 24 | 169 | 4.9 hrs BEHIND | 1 | 2:59:58 | ACTIVE | FURN C4 | 1875 | SAC OX | DIFFUSION |
| 10 | PF1550 | E004024G | 12 | 181 | 1.2 days BEHIND | 1 | 6:05:04 | QUEUE | | 1875 | SAC OX | DIFFUSION |
| 11 | PF1550 | E00402DA | 24 | 205 | 1.2 days BEHIND | 1 | 6:05:04 | ACTIVE | | 1875 | SAC OX | DIFFUSION |
| 12 | PF1550 | E004025M | 24 | 229 | 4.9 hrs BEHIND | 1 | 6:05:04 | ACTIVE | | 1875 | SAC OX | DIFFUSION |
| 13 | PF1550 | E00402FF | 24 | 253 | 19.1 hrs AHEAD | 1 | 6:05:04 | QUEUE | | 1875 | SAC OX | DIFFUSION |
| 14 | PF1550 | E00402EG | 24 | 277 | 8.6 hrs BEHIND | 2 | 6:28:04 | ACTIVE | | 1625 | PAD OX STP | DIFFUSION |
| 15 | PF1550 | E00402FE | 24 | 301 | 15.4 hrs AHEAD | 2 | 6:28:04 | ACTIVE | | 1625 | PAD OX STP | DIFFUSION |
| 16 | PF1550 | E004025J | 24 | 325 | 0.0 hrs BEHIND | 3 | 7:54:04 | QUEUE | | 1620 | CMP NIT ST | ETCH |

FIG. 3B

| | A | B | C | D | E | F | G | H | I | J | K |
|---|---|---|---|---|---|---|---|---|---|---|---|
| 1 | HOT | Name | lot_number | Wafers | Vpoly_recipe | dryboxexp2 | Current_Op | owning_entity | spec_id | step_number | HOLD |
| 2 | | | CD0906TW | 25 | PF1550 | 06/11/2003 18:53:20 | 2800 | | PF1550 | 0 | |
| 3 | | MIDTERM | X003526D | 24 | PF1228 | 06/12/2003 18:01:41 | 3910 | | PF1228 | 0 | |
| 4 | | SWILL | X003526E | 24 | PF1228 | 06/12/2003 18:01:41 | 3910 | | PF1228 | 0 | |
| 5 | | STICK | E00402EJ | 24 | PF1550 | 06/13/2003 19:30:17 | 1875 | FURN C4 | PF1513 | 600 | |
| 6 | | GIFT | E00402DB | 24 | PF1228 | 06/13/2003 19:30:17 | 1875 | FURN C4 | PF1513 | 600 | |
| 7 | | SLINK | E00402KD | 12 | PF1550 | 06/13/2003 19:30:17 | 1875 | FURN C4 | PF1513 | 600 | |
| 8 | | PULSE | E00402F | 12 | PF1550 | 06/13/2003 19:30:17 | 1875 | FURN C4 | PF1513 | 600 | |
| 9 | | STOPCOCI | E00402Z | 24 | PF1550 | 06/13/2003 19:30:17 | 1875 | FURN C4 | PF1513 | 600 | |
| 10 | | GAZE | E00402EH | 24 | PF1550 | 06/13/2003 19:30:17 | 1875 | FURN C4 | PF1513 | 600 | |
| 11 | | VALIDATE | E00402EF | 24 | PF1588 | 06/13/2003 20:26:55 | 2100 | FURN G3 | PF1556 | 650 | |
| 12 | | PAVES | E003524V | 24 | PF1588 | 06/13/2003 20:26:55 | 2100 | FURN G3 | PF1556 | 650 | |
| 13 | | TEMERITY | E004015H | 24 | PF1588 | 06/13/2003 20:26:55 | 2100 | FURN G3 | PF1556 | 650 | |
| 14 | | RESCALE | E00352GY | 24 | PF1588 | 06/13/2003 20:26:55 | 2100 | FURN G3 | PF1556 | 650 | |
| 15 | | STARGAZE | E00402SM | 24 | PF1550 | 06/13/2003 21:19:32 | 1875 | FURN C1 | PF1513 | 600 | |
| 16 | | KARI | E00402DA | 24 | PF1550 | 06/13/2003 21:19:32 | 1875 | FURN C1 | PF1513 | 600 | |
| 17 | | ROOKIE | E00401AB | 24 | PF1588 | 06/14/2003 03:08:01 | 2100 | 2WD 11 | PF1556 | 190 | |
| 18 | | WHATNOT | E00401GC | 24 | PF1588 | 06/14/2003 03:08:01 | 2100 | 2WD 11 | PF1556 | 190 | |
| 19 | | TROLLEY | E004017K | 24 | PF1588 | 06/14/2003 03:08:01 | 2100 | 2WD 11 | PF1556 | 190 | |
| 20 | | ASCOT | | | | | | | | | |

FIG. 4B

SYSTEM AND METHOD FOR VISUALIZING THE USE OF RESOURCES IN A PROCESS SYSTEM

CROSS-REFERENCE TO RELATED APPLICATIONS

This patent application is related to U.S. patent application Ser. No. 10/299,949 entitled "SYSTEMS FOR ALLOCATING MULTI-FUNCTION RESOURCES IN A PROCESS SYSTEM AND METHODS OF OPERATING THE SAME" filed on Nov. 19, 2002, which is hereby incorporated by reference.

TECHNICAL FIELD

This disclosure is generally directed to resource allocation and process control systems, and more specifically to a system and method for visualizing the use of resources in a process system.

BACKGROUND

Resource allocation systems are typically responsible for allocating multi-function resources among a variety of tasks. As particular examples, the multi-function resources may include manufacturing tools, instruments, hardware, software, databases, communication or connectivity resources, transportation resources, facilities, utilities, personnel, and inventories. Allocation of resources may involve management, administration, command, control, direction, governance, monitoring, or regulation of the resources. The tasks may represent processes performed in a manufacturing plant, a semiconductor fabrication facility, a mineral or crude oil refinery, a corporate communications network, a data repository and management system, or any other suitable arrangement, structure, or system.

A problem with conventional resource allocation systems is that they typically exhibit poor response to constantly changing or exigent circumstances. As a result, these conventional systems often fail to optimize the use of resources, particularly resources capable of performing multiple functions. Because resource use is not optimized, it may take longer to perform the tasks using the resources, which also increases the costs associated with the use of the resources.

BRIEF DESCRIPTION OF THE DRAWINGS

For a more complete understanding of this disclosure and its features, reference is now made to the following description, taken in conjunction with the accompanying drawings, in which:

FIG. 1 illustrates an example process system according to one embodiment of this disclosure;

FIGS. 2A through 2C illustrate an example graphical user interface ("GUI") visualizing the use of resources according to one embodiment of this disclosure;

FIGS. 3A and 3B illustrate an example product bucket in the graphical user interface of FIG. 2A according to one embodiment of this disclosure;

FIGS. 4A and 4B illustrate an example virtual queue in the graphical user interface of FIG. 2A according to one embodiment of this disclosure.

DETAILED DESCRIPTION

Figures 1, 2A:
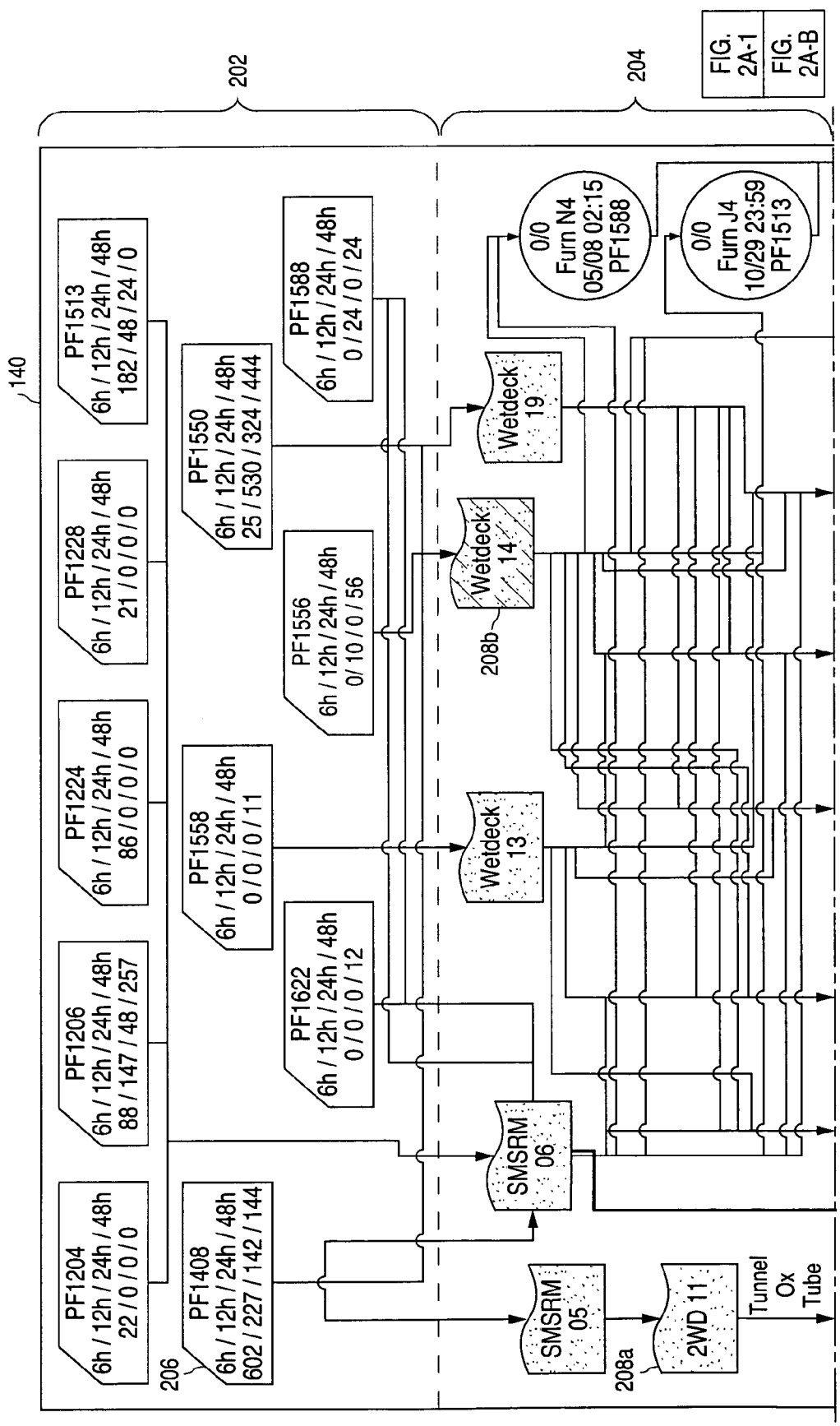
Figures 2, 2A:
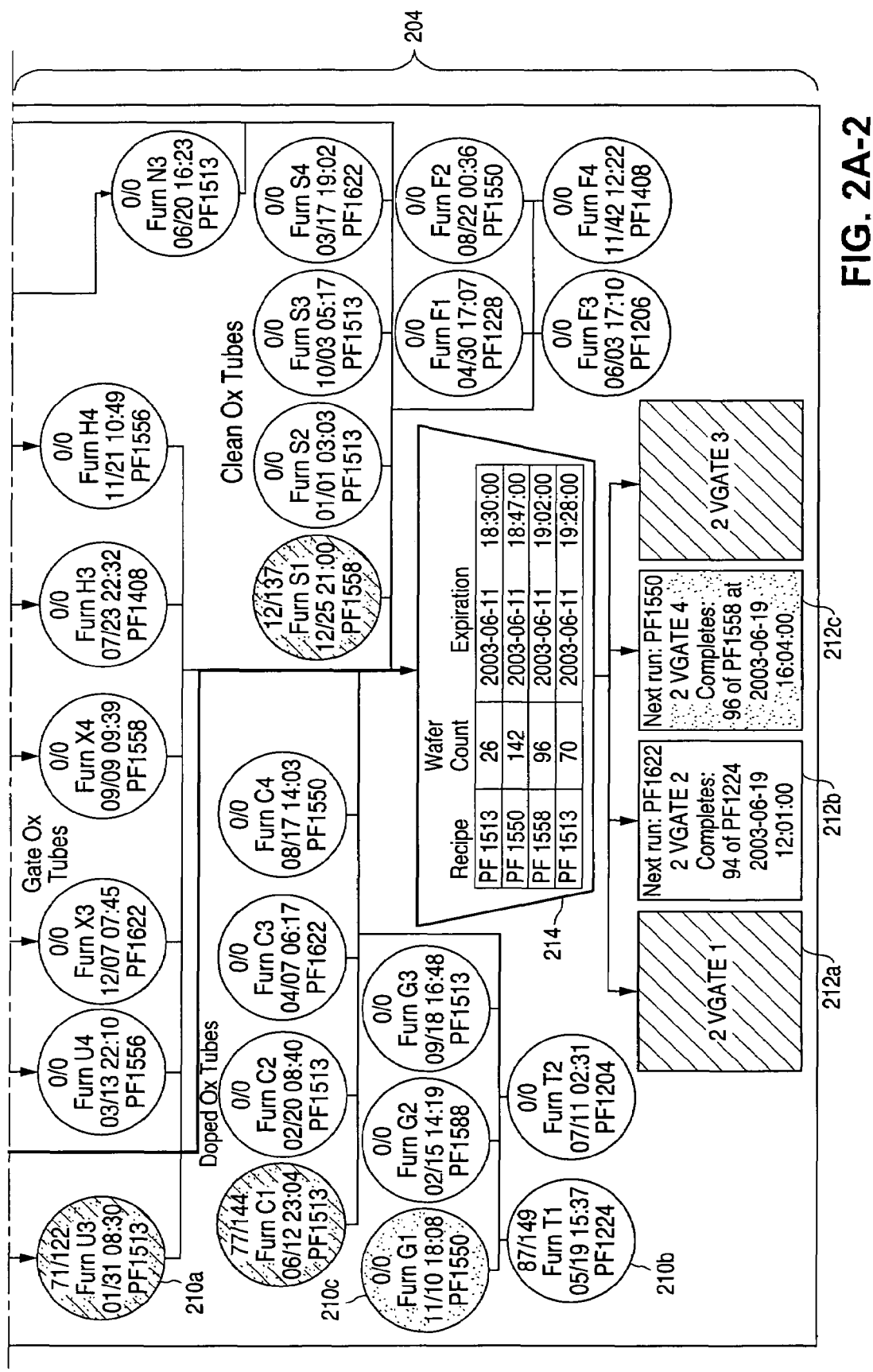

FIG. 1 illustrates an example process system 100 according to one embodiment of this disclosure. The system 100 shown in FIG. 1 is for illustration only. Other systems may be used without departing from the scope of this disclosure.

The process system 100 shown in FIG. 1 represents any computer processing system, network of computer processing systems, or a portion thereof that is operable to monitor, control, or otherwise supervise a process or processes. Example processes may include information management, manufacturing such as semiconductor fabrication, traffic control, transportation control, or any other suitable process or processes.

In the illustrated example, the system 100 includes a plurality of application processes 105a–105l. An application process 105 represents a program or a part of a program that can execute, whether independently of other parts or not, and is designed for or to meet the needs of the process system 100. An application process 105 may represent low-level, mid-level, or high-level programs or parts thereof that interact with the process system 100.

In particular embodiments, the process system 100 is associated with a semiconductor fabrication facility or facilities, which are operable to handle multiple and varied application processes 105 associated with complex multi-function resources used to manufacture multiple and possibly varying semiconductor products. For example, the multi-function resources could include wet decks, horizontal furnaces, and vertical furnaces, where various combinations of the resources are used to produce different semiconductor wafers.

A resource allocator 110 is operable to allocate a plurality of multi-function resources 115 among a plurality of tasks 120 within the process system 100. As a particular example, the multi-function resources 115 may suitably represent any tool, device, or other system used in the manufacturing process of semiconductor products. In some embodiments, the resource allocator 110 is a general processor that is operable to accept variable service requests and to intelligently apply the required resource(s) 115 to address such requests, although other embodiments of the resource allocator 110 could be used.

In the illustrated example, the resource allocator 110 includes a memory 125, a monitoring controller 130, and a resource allocation controller 135. The resource allocator 110 is also associated with a graphical user interface ("GUI") 140, which provides graphical information to a user. The information provided by the GUI 140 may be supplied to the user in any suitable manner, such as through web-base connectivity.

The memory 125 is operable to store a model 145 of process system 100. In some embodiments, the model 145 mathematically represents the application processes 105, multi-function resources 115, and tasks 120. The model 145 also defines various relationships among related ones of the application processes 105, the multi-function resources 115, and tasks 120.

In particular embodiments, the memory 125 includes a plurality of databases used for service/function, control, and knowledge. As examples, a service/function database may be operable to store information regarding customers, networks, transactions, resources, communications, or the like. A control database may be operable to store algorithms, rules, key elements for decision-making, or the like. A knowledge database may be operable to provide task related intelligent information to help make optimal decisions and to acquire and accumulate experience through evaluating results (such as artificial intelligence, expert system analysis, neural networks, etc.).

The monitoring controller 130 is operable to monitor measurable characteristics associated with ones of the application processes 105, multi-function resources 115, and tasks 120. In some embodiments, the monitoring controller 130 is a real-time monitor of updated status or logistical data of resources 115 and tasks 120 and enables human interaction online with other subsystems, allowing a human interface to respond to, modify, update, or over-ride the automated decision-making processes. In particular embodiments, each of the measurable characteristics is one of a status characteristic or a logistical characteristic.

The resource allocation controller 135 is responsive to ones of the monitored measurable characteristics and may be operable to: (i) operate the model 145; (ii) modify ones of the mathematical representations of the application processes 105, multi-function resources 115, tasks 120, and the defined relationships among related ones of the application processes 105, multi-function resources 115, and tasks 120; and (iii) allocate ones of the resources 115 among ones of the tasks 120 within the process system 100.

The GUI 140 is a user interface that is operable to transform real-time process system information into an audio or visual format to enable supervisory interaction. In some embodiments, the GUI 140 is operable to visualize the data and status of external resources, service requests, and on-going transactions by using graphic displays to provide real-time data as well as historical and statistical information with human interaction. An example GUI 140 is shown in FIGS. 2A through 2C, which are described below. The GUI 140 may be generated by any suitable hardware, software, firmware, or combination thereof.

In one aspect of operation, the resource allocator 110 or other component in the process system 100 generates a GUI 140 that visualizes the process flows between various resources 115. As a particular example, the GUI 140 may visualize the process flows between various wet decks and furnaces used in a semiconductor fabrication facility. The GUI 140 further allows the use of a particular resource, such as a particular furnace or group of furnaces, to be modeled and visualized for a specified amount of time. By visualizing use of the resource, the resource allocator 110 or a user can identify ways in which the resource can be used more effectively.

As an example, assume in a semiconductor fabrication facility that each of four vertical furnaces can receive up to one hundred semiconductor wafers at a time. The GUI 140 shows when different types of semiconductor wafers will be ready for processing by a vertical furnace. The information shown in the GUI 140 can be used by the resource allocator 110 or by a user to determine if two or sets or "lots" of semiconductor wafers can be combined into a single run through a vertical furnace. A "run" represents a group of semiconductor wafers being sent or to be sent through a furnace. As a particular example, if one lot includes twenty five wafers and another lot includes seventy wafers, the user or the resource allocator 110 may combine or "batch" the two lots into a single run through the vertical furnace. In this way, the vertical furnace is used in a more optimal manner since the wafers are processed in a single run instead of two. This frees the vertical furnace to process additional wafers. This also reduces the time needed to produce the wafers and decrease the costs associated with the production of the wafers.

The description of the additional figures that follows often describes the use of the GUI 140 and the resource allocator 110 in a semiconductor fabrication facility. This represents one specific example of how the GUI 140 and the resource allocator 110 may be used. The GUI 140 and the resource allocator 110 could be used in any other suitable process system 100 without departing from the scope of this disclosure.

Although FIG. 1 illustrates one example of a process system 100, various changes may be made to FIG. 1. For example, the process system 100 may include any number of resources 115 and tasks 120. Also, the embodiment of the resource allocator 110 shown in FIG. 1 is for illustration only. Any other or additional embodiments of the resource allocator 110 could be used.

FIGS. 2A through 2C illustrate an example graphical user interface ("GUI") 140 visualizing the use of resources 115 according to one embodiment of this disclosure. In particular, the GUI 140 visualizes the process flow in a semiconductor fabrication facility that includes wet decks and furnaces. The GUI 140 shown in FIGS. 2A through 2C is for illustration only. Other GUIs 140 could be used in the system 100 of FIG. 1 or in any other suitable system without departing from the scope of this disclosure.

As shown in FIG. 2A, the GUI 140 is divided into two portions 202 and 204. The first portion 202 represents work in process ("WIP"), and the second portion 204 represents the resources 115 of the semiconductor fabrication facility.

The first portion 202 identifies items that could be produced or otherwise processed by the various resources 115 in the semiconductor fabrication facility for a specified amount of time. The term "item" refers to a product, structure, object, data, or other tangible or intangible article that is produced or otherwise processed by one or more resources 115.

In some embodiments, a semiconductor fabrication facility produces different types of semiconductor wafers. Each type of wafer is associated with a unique composition, structure, or process, which may be referred to as a "recipe." In FIG. 2A, the first portion 202 of the GUI 140 includes a plurality of buckets 206, each associated with a particular type of wafer that can be produced.

In particular embodiments, each bucket 206 identifies one or more time frames and the number of wafers that are scheduled for production in each of those time frames. Based on this information, a user viewing the GUI 140 can identify the numbers and types of wafers to be produced in some future period of time. One example of a bucket 206 is shown in FIGS. 3A and 3B, which are described below.

The second portion 204 of the GUI 140 identifies and visualizes the various resources 115 of the semiconductor fabrication facility and the flows of wafers between the resources 115. In the illustrated example, the second portion 204 includes a number of different objects, and each object is associated with a resource 115. Lines between the objects represent the possible flows of semiconductor wafers between the resources 115. Different types of semiconductor wafers often take different paths through the various resources 115.

Each object includes a name of a resource 115 that is associated with the object. Each name could represent any suitable identifier, such as an alphanumeric identifier.

In some embodiments, the different shapes of the objects in the second portion 204 identify different types of resources 115 in the semiconductor fabrication facility, and the shading or color of an object identifies the status of the resource 115 associated with that object. In this example, the second portion 204 of the GUI 140 includes irregular shaped objects 208a–208b representing different wet decks in the semiconductor fabrication facility. The objects 208, such as object 208a, without hatching represent wet decks that are up and available for use. The objects 208, such as object 208b, with hatching represent wet decks that are down and unavailable for use.

The second portion 204 of the GUI 140 also includes circular objects 210a–210c representing horizontal furnaces in the semiconductor fabrication facility. The horizontal furnaces may include gate ox furnaces, tunnel ox furnaces, clean ox furnaces, and doped ox furnaces. The objects 210, such as object 210a, with dots or shading and hatching represent furnaces that are unavailable for use. The objects 210, such as object 210b, with no shading or lighter shading represent furnaces that are operational and available for use. The objects 210, such as object 210c, with dots or darker shading represent furnaces that are operational and actually in use. Any color or shading can be used to represent the status of a resource 115.

As shown in FIG. 2B, each object 210 contains information associated with the lot of wafers that was last processed or that is currently being processed by a furnace. For example, the object 210 includes the name 250 assigned to the resource 115 associated with the object 210. The object 210 also identifies the recipe 252 of the wafers processed in the current or previous run in the furnace. The object 210 further includes a timestamp 254 that identifies when the current or previous run begins or ends. In addition, the object 210 includes a count 256 identifying the total number of wafers in the current run and a count 258 identifying the number of wafers in the current run that are destined for one or more resources 115 that a user wishes to monitor. As described below, in this example, the count 258 identifies the number of wafers in the current run that are destined for a vertical furnace.

The second portion 204 of the GUI 140 further includes square objects 212a–212c representing vertical furnaces in the semiconductor fabrication facility. A vertical furnace could, for example, represent a vertical polysilicon furnace (also referred to as a vertical poly furnace). The objects 212, such as object 212a, with hatching represent unavailable vertical furnaces. The objects 212, such as object 212b, with no shading or lighter shading represent idle and available vertical furnaces. The objects 212, such as object 212c, with dots or darker shading represent vertical furnaces that are currently in use.

As shown in FIG. 2C, each object 212 includes information about the current or previous run of wafers processed by the associated vertical furnace. For example, the object 212 identifies the name 280 assigned to the furnace associated with the object 212. The object 212 also identifies the recipe 282 of the wafers contained in the current or previous run and the number 284 of wafers in that run. The object 212 further identifies the expected or actual completion date 286 and time 288 of the current or previous run. In addition, the object 212 identifies the recipe 290 of the wafers to be contained in the next run.

In this example, the GUI 140 further includes a virtual queue 214. The virtual queue 214 identifies the various items to be provided to one or more particular resources 115 in the process system 100. In this embodiment, the virtual queue 214 identifies the wafer lots that will be provided to one or more vertical poly furnaces (represented by objects 212) for a specified amount of time in the future. In this way, the virtual queue 214 represents an abstraction of the vertical poly furnaces, where use of a vertical poly furnace is reserved by listing a wafer lot in the virtual queue 214. A wafer lot may be listed in the virtual queue 214 at any suitable time, such as when the wafer lot is initially provided to a wet deck represented by an object 208 or to a furnace represented by an object 210.

By providing a virtual queue 214, the GUI 140 provides a snapshot of materials flowing into a particular resource or resources 115 in the semiconductor fabrication facility. The snapshot is readily available, highly graphical, and updated in real-time. Moreover, the use of the vertical poly furnaces can be modeled by the virtual queue 214.

In addition, the virtual queue 214 may be examined to determine whether different wafer lots can be batched or combined into a single run through a vertical poly furnace. The list can be examined by a user, by the resource allocator 110, or by any other or additional component in the system 100. One example of a virtual queue 214 is shown in FIGS. 4A and 4B, which are described below.

In some embodiments, the contents of the GUI 140 may be refreshed or updated at specified intervals, which updates the values contained in the various buckets 206 and objects 208–212. In other embodiments, the resource allocator 110 may update the GUI 140 in response to a user request. As an example, the user may use a mouse to update the GUI 140. As particular examples, the user could update a bucket 206 or object 208–212 by double clicking a cursor placed on the bucket 206 or object 208–212. The user could also right-click the cursor, which may open a context menu that contains an update option. The user could further update the entire GUI 140 by right-clicking on a "white space" in the GUI 140, or a space where no buckets 206 or objects 208–212 lie. Other refresh mechanisms, including a combination of updating at specified intervals and in response to user input, could be used.

Although FIGS. 2A through 2C illustrate one example of a GUI 140 visualizing the use of resources 115, various changes may be made to FIGS. 2A through 2C. For example, the number and arrangement of buckets 206 and objects 208–212 are for illustration only. Any other processes involving different buckets 206 or resources 115 represented by objects 208–212 may be modeled in the GUI 140. Also, the contents and arrangement of the bucket 206 and the object 210 in FIGS. 2B and 2C are for illustration only. Other or additional information can be included in the bucket 206 or the object 210, and the information can be arranged in any suitable manner. In addition, while FIG. 2A illustrates a single virtual queue 214 in the GUI 140, the GUI 140 could include any number of virtual queues 214 associated with any number of resources 115 or types of resources 115.

FIGS. 3A and 3B illustrate an example product bucket 206 in the graphical user interface 140 of FIG. 2A according to one embodiment of this disclosure. The bucket 206 shown in FIGS. 3A and 3B is for illustration only. Other embodiments of the bucket 206 may be used without departing from the scope of this disclosure.

As shown in FIG. 3A, the bucket 206 includes a recipe 300, which identifies one type of semiconductor wafer that may be produced by the semiconductor fabrication facility modeled in the GUI 140. The bucket 206 also includes a plurality of time windows 302. The time windows 302 identify different lengths of time in the future during which the identified type of semiconductor wafer may be produced. In this example, the time windows 302 include a six hour window, a twelve hour window, a twenty four hour window, and a forty eight hour window. The number and lengths of the time windows 302 are for illustration only. Any other number of time windows 302 may be used, and time windows 302 having other or additional lengths may be used.

Each of the time windows 302 is associated with a wafer count 304. Each wafer count 304 identifies the number of wafers scheduled to be produced during one of the time windows 302. In some embodiments, each wafer count 304 represents a running total that includes any previous wafer counts 304. In these embodiments, based on the bucket 206 shown in FIG. 3A, 444 wafers would be produced in the next two days. In other embodiments, the wafer counts 304 are mutually exclusive, meaning that the wafer count 304 in one time window 302 identifies the number of wafers produced in addition to the wafers produced during any previous time windows 302. In these embodiments, based on the bucket 206 shown in FIG. 3A, 1,323 wafers (the sum of all four wafer counts 304) would be produced in the next two days.

A similar bucket 206 could be provided for each possible wafer recipe in the GUI 140 of FIG. 2A. By including the various time windows 302 and wafer counts 304 in the GUI 140, a user may easily identify the number and type of wafers to be produced in a specified time period, in this case two days.

In some embodiments, a user may obtain additional information about the semiconductor wafers scheduled for production in the bucket 206. For example, the user may place a cursor on the bucket 206 using a mouse and right-click the mouse, which may open a context menu containing an additional information option. As a particular example, the additional information option could open a Microsoft Excel spreadsheet containing information about the wafers to be produced.

As shown in FIG. 3B, a spreadsheet 350 includes one or more entries 352. Each entry 352 is associated with a wafer lot that will be sent through the various resources 115 in the semiconductor fabrication facility.

In this example, each entry 352 includes an index 354 uniquely identifying the entry 352. Each entry 352 also includes a recipe 356, which equals the recipe 300 contained in the bucket 206 that is associated with the spreadsheet 350.

A lot number 358 identifies a particular wafer lot. A wafer count 360 identifies the number of wafers in a wafer lot. A cumulative wafer count 362 in an entry 352 identifies the total number of wafers contained in that entry 352 and in all previous entries 352.

A priority class 364 identifies the priority of a wafer lot. In some embodiments, the process system 100 processes wafer lots according to the priorities of the wafer lots, such as when higher priority wafer lots are processed ahead of lower priority wafer lots. In this way, the times when the wafer lots are processed may be altered by adjusting the priority of one or more lots. In this example, the priority class 364 identifies whether a wafer lot is behind schedule, ahead of schedule, or associated with a stock out of a needed component.

An operations to poly count 366 identifies the number of operations to be performed on a wafer lot before the wafer lot reaches a resource 115 of interest (in this case, a vertical poly furnace). A time to poly 368 identifies the expected amount of time before a wafer lot reaches the resource 115 of interest (in this case, a vertical poly furnace).

A status indicator 370 identifies whether a wafer lot is actively being processed by resources 115 in the semiconductor fabrication facility or is waiting to be processed. An owning entity 372 identifies the resource 115 that is currently processing a wafer lot. A current operation identifier 374 represents a numeric indicator for the operation being performed by the resource 115 that is processing a wafer lot. A current operation description 376 describes the operation being performed by the resource 115 that is processing a wafer lot. A current quad 378 identifies the type of operation being performed by the resource 115 that is processing a wafer lot. In this example, the current quad 378 includes diffusion and etching operations, although any other or additional types of operations could be performed.

A different spreadsheet 350 could be provided for each bucket 206 in the GUI 140 of FIG. 2A. In this way, a user can easily select and view detailed information about a particular type of semiconductor wafer to be processed by the resources 115.

Although FIGS. 3A and 3B illustrate one example of a product bucket 206 in the GUI 140 of FIG. 2A, various changes may be made to FIGS. 3A and 3B. For example, the content and arrangement of the bucket 206 are for illustration only. Other or additional information in any other arrangements may be used. Also, the content and arrangement of the spreadsheet 350 are for illustration only. Other or additional information may be included in the spreadsheet 350, and the information may be arranged in any suitable manner.

FIGS. 4A and 4B illustrate an example virtual queue 214 in the graphical user interface 140 of FIG. 2A according to one embodiment of this disclosure. The virtual queue 214 shown in FIGS. 4A and 4B is for illustration only. Other embodiments of the virtual queue 214 may be used without departing from the scope of this disclosure.

As shown in FIG. 4A, the virtual queue 214 includes a table 400 having one or more entries 402a–402d. Each entry 402 includes a recipe 404, a wafer count 406, and an expiration 408 for at least one wafer lot to be processed by a resource of interest (in this case, one or more vertical poly furnaces). The recipe 404 identifies the type of semiconductor wafers in a wafer lot. The wafer count 406 identifies the number of wafers contained in a wafer lot.

The expiration 408 identifies the time by which a wafer lot should be provided to a resource 115 of interest. For example, in some embodiments, a wafer lot is processed by a wet deck or other furnace and then queued for entry into a vertical poly furnace. A wafer lot typically can remain in the queue only for a limited amount of time, such as six hours. After that time, the wafer lot may need expensive additional processing or be scrapped. The expiration 408 identifies the latest time by which a wafer lot is should be placed in a vertical poly furnace.

Information about a wafer lot may be inserted into the virtual queue 214 at any suitable time. For example, the information may be inserted when the wafer lot is first provided to a resource 115 for processing or when a wafer lot is first scheduled for production. As a particular example, when a new wafer lot is provided to a resource 115 or scheduled for production, the resource allocator 110 identifies the processing to be performed on the wafer lot and the time needed to perform the processing. The resource allocator 110 uses this information to identify the latest time when the wafer lot would need to be provided to a vertical poly furnace. After that, the resource allocator 110 inserts an entry 402 into the table 400 for that wafer lot. In this way, the expected use of the vertical poly furnaces may be identified and constantly updated as production continues and changes over time.

Moreover, the resource allocator 110 or a user may use the table 400 to identify different wafer lots that can be combined into a single run through a vertical poly furnace. For example, the wafers associated with one recipe typically cannot be mixed in a vertical poly furnace with wafers associated with another recipe. If two or more entries 402 represent wafer lots produced using the same recipe 404, the wafer lots may be able to be combined into a more optimal run or runs through a vertical poly furnace. As a particular example, the first entry 402*a* in the table 400 identifies a wafer lot with twenty six wafers, and the last entry 402*d* identifies a wafer lot with seventy wafers. These entries 402 are associated with the same recipe 404. Assuming that a run can involve a maximum of one hundred wafers, the wafer lots can be batched into a single run since both wafer lots collectively involve ninety six wafers. In this way, the use of the vertical poly furnaces may be more optimal since fewer runs are needed to process the wafer lots. In addition, the resource allocator 110 or the user may determine whether two or more wafer lots can be batched together before each lot's expiration 408 passes. If so, the wafer lots may be batched together into a single run. Otherwise, the resource allocator 110 or the user may need to adjust the priority of one or more of the wafer lots. This may alter one or more of the lot's expirations 408, which may allow the wafer lots to be combined into a single run without any lot exceeding its expiration 408.

A user could also obtain additional information about the wafer lots identified in the table 400. For example, the user could position a cursor on the virtual queue 214 using a mouse, right-click the mouse, and select an additional information option in a context menu. As a particular example, the additional information option could open a Microsoft Excel spreadsheet.

An example spreadsheet 450 (which does not correspond to the example virtual queue 214 in FIG. 4A) is shown in FIG. 4B. As shown in FIG. 4B, the spreadsheet 450 includes one or more entries 452. Each entry 452 is associated with a wafer lot that will be sent through the resource 115 of interest in the semiconductor fabrication facility (in this case, the vertical poly furnace).

In this example, each entry 452 includes an index 454 uniquely identifying the entry 452. Each entry 452 also includes a hot flag 456, which indicates whether production of the wafer lot needs to be accelerated. Each entry 452 further includes a name 458, which identifies a name associated with a wafer lot.

A lot number 460 identifies a particular wafer lot being processed or that will be processed. A wafer count 462 identifies the number of wafers contained in a wafer lot. A recipe 464 identifies the type of semiconductor wafers contained in a wafer lot. A time window 466 identifies the expiration time associated with a wafer lot. The time window 466 may represent the same expiration time 408 contained in the virtual queue 214.

A current operation identifier 468 represents a numeric indicator of the operation being performed by the resource 115 that is currently processing a wafer lot. An owning entity 470 identifies a resource 115 that is currently processing a wafer lot. A recipe identifier 472 identifies the next type of semiconductor wafer to be processed by the owning entity 470. A step number 474 identifies a current step in the processing of a wafer lot. A hold lot flag 476 indicates whether the processing of a wafer lot has been placed on hold.

The spreadsheet 450 could be updated after various events occur, such as when a new wafer lot is added to a bucket 206, a wafer lot is completely processed by a vertical poly furnace, or the priority of a wafer lot is changed.

Although FIGS. 4A and 4B illustrate one example of a virtual queue 214 in the GUI 140 of FIG. 2A, various changes may be made to FIGS. 4A and 4B. For example, the content and arrangement of the virtual queue 214 are for illustration only. Other or additional information in any other arrangements may be used. Also, the content and arrangement of the spreadsheet 450 are for illustration only. Other or additional information may be included in the spreadsheet 450, and the information may be arranged in any suitable manner.

Figure 5:
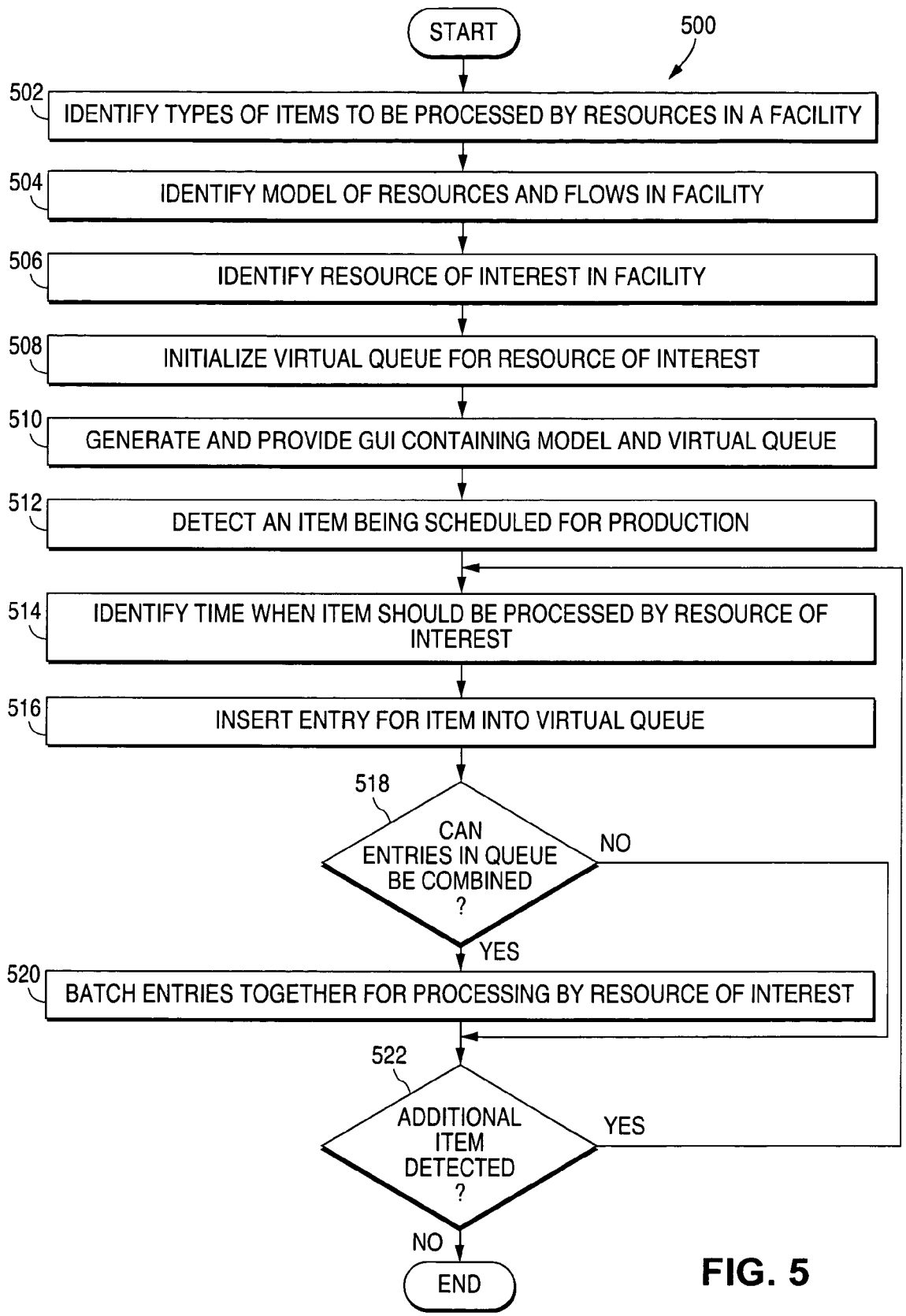
FIG. 5 illustrates an example method for visualizing the use of resources in a process system according to one embodiment of this disclosure.

FIG. 5 illustrates an example method 500 for visualizing the use of resources 115 in a process system 110 according to one embodiment of this disclosure. For ease of explanation, the method 500 is described with respect to the GUI 140 of FIG. 2A being produced in the process system 100 of FIG. 1. The method 500 may be used with any other GUIs and in any other systems without departing from the scope of this disclosure.

The resource allocator 110 identifies various types of items to be processed by resources 115 in the process system 100 at step 502. This may include, for example, the resource allocator 110 receiving information from a memory or from a user identifying various types of semiconductor wafers that can be produced by a semiconductor fabrication facility.

The resource allocator 110 models the resources 115 and the flows between the resources 115 in the process system 100 at step 504. This may include, for example, the resource allocator 110 receiving information from a memory or from a user identifying various wet decks and furnaces in a semiconductor fabrication facility. This may also include the resource allocator 110 receiving information from a memory or from a user identifying the flow of wafer lots between the wet decks and furnaces for each of the various recipes or types of wafers.

The resource allocator 110 identifies a particular resource or resources 115 of interest at step 506. This may include, for example, the resource allocator 110 allowing a user to select a particular furnace or type of furnace in the semiconductor fabrication facility as being the resource 115 of interest.

The resource allocator 110 initializes a virtual queue 214 for the resource 115 of interest at step 508. This may include, for example, the resource allocator 110 initializing a table 400, which will be used to store information about wafer lots to be run through the resource 115 of interest.

The resource allocator 110 generates and provides a graphical user interface displaying information about the process system 100 at step 510. This may include, for example, the resource allocator 110 generating the GUI 140 shown in FIGS. 2A through 2C, 3A and 3B, and 4A and 4B. In particular, this may include the resource allocator 110 generating and inserting into the GUI 140 a bucket 206 for each item identified in step 502, objects 208–212 for the various resources 115 modeled at step 504, and a virtual queue 214 initialized at step 508.

The resource allocator 110 detects when an item is scheduled for production at step 512. This may include, for example, the resource allocator 110 detecting when an item is scheduled for production within one or more of the time windows 302 in the bucket 206 associated with the item or when the item is provided to one of the resources 115. The item may, for example, represent one or more semiconductor wafer lots to be processed by the resources 115.

The resource allocator 110 identifies a time when the newly scheduled item should be processed by the resource 115 of interest at step 514. This may include, for example, the resource allocator 110 identifying other resources 115 that will receive and process the newly scheduled item before the resource 115 of interest. This may also include the resource allocator 110 identifying the total amount of time that it should take for the other resources 115 to process the newly scheduled item. This may further include the resource allocator 110 identifying the maximum amount of time that may elapse while the newly scheduled item is waiting to be supplied to the resource 115 of interest. The resource allocator 110 may then add the total amount of time needed to process the newly scheduled item by the other resources 115 and the maximum amount of time that the newly scheduled item can wait. Any other or additional mechanisms can be used to identify the time when the newly scheduled item should be provided to the resource 115 of interest.

The resource allocator 110 inserts an entry for the newly scheduled item into the virtual queue 214 at step 516. This may include, for example, the resource allocator 110 inserting a new entry 402 into the virtual queue 214 identifying the item to be processed and the latest time when the item should be provided to the resource 115 of interest.

The resource allocator 110 determines whether two or more entries in the virtual queue 214 can be combined at step 518. This may include, for example, the resource allocator 110 receiving from a user an indication that two or more entries 402 in the table 400 can be combined. In the semiconductor fabrication example, two or more entries may be combined when the entries 402 represent wafer lots having a common recipe 404. This may also include the resource allocator 110 automatically detecting when entries 402 can be combined, which may or may not be based on rules or other logic established by a user.

It may be advantageous to combine different wafer lots when the resource 115 of interest can process the combined lots more efficiently than processing the lots separately. As an example, it may be advantageous to combine the wafer lots when the number of runs through a vertical poly furnace would be reduced by batching or combining the wafer lots.

If two or more entries may be combined, the resource allocator 110 batches the entries for processing by the resource 115 of interest at step 520. This may include, for example, the resource allocator 110 combining the entries 402 into a single entry 402 or otherwise associating the entries 402 so that the items represented by those entries 402 will be processed as a batch by the resource 115 of interest.

The resource allocator 110 determines whether any additional items are scheduled for processing at step 522. If so, the resource allocator 110 returns to step 514 to process the additional item.

Although FIG. 5 illustrates one example of a method 500 for visualizing the use of resources 115 in a process system 100, various changes may be made to FIG. 5. For example, the order of various ones of the steps may be altered as desired. Also, multiple virtual queues 214 may be used in the method 500, such as when a user wants to monitor different types of resources 115.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A resource allocator operable to allocate a plurality of resources among a plurality of tasks within a process system, the process system capable of executing at least one application process, the resource allocator comprising:
   a monitoring controller operable to monitor one or more characteristics associated with the at least one application process, the resources, and the tasks;
   a model of the process system representing mathematically the resources and the tasks and defining relationships among related ones of the resources and the tasks as a function of the at least one application process;
   a resource allocation controller operable to operate the model in response to ones of the monitored characteristics to allocate ones of the resources among ones of the tasks to execute the at least one application process; and
   a graphical user interface operable to identify (i) the resources and (ii) flows between at least some of the resources, the graphical user interface comprising at least one virtual queue associated with at least one of the resources and identifying one or more items to be processed by the at least one of the resources.

2. The resource allocator of claim 1, wherein:
   the resources comprise one or more wet decks and one or more furnaces, the one or more furnaces comprising at least one vertical polysilicon furnace; and
   one or more virtual queues are associated with the at least one vertical polysilicon furnace, the one or more items identified in the one or more virtual queues comprising a plurality of semiconductor wafer lots to be run through the at least one vertical polysilicon furnace.

3. The resource allocator of claim 2, wherein the one or more virtual queues identify a recipe associated with each semiconductor wafer lot, a number of semiconductor wafers in each semiconductor wafer lot, and a latest time when each semiconductor wafer lot should be provided to the at least one vertical polysilicon furnace.

4. The resource allocator of claim 3, wherein the one or more virtual queues are associated with one or more spreadsheets, the one or more spreadsheets comprising additional information about the semiconductor wafer lots.

5. The resource allocator of claim 2, wherein the graphical user interface comprises:
   a first portion identifying at least two types of semiconductor wafers to be processed; and
   a second portion identifying the one or more wet decks, one or more furnaces, and flows of semiconductor wafer lots between at least some of the one or more wet decks and the one or more furnaces, the second portion comprising the one or more virtual queues.

6. The resource allocator of claim 5, wherein the first portion comprises a plurality of buckets, each bucket associated with one type of item to be processed by the resources, each bucket identifying a plurality of time periods and a number of items to be processed during each of the time periods.

7. The resource allocator of claim 6, wherein each bucket is associated with a spreadsheet, the spreadsheet comprising additional information about the items of the associated item type to be processed.

8. The resource allocator of claim 5, wherein the second portion comprises a plurality of objects, each object associated with one of the resources, at least two different types of resources associated with objects of different shapes.

9. The resource allocator of claim 8, wherein at least one object has at least one of an associated color and an associated shading that identifies a status of the resource associated with the object.

10. The resource allocator of claim 8, wherein at least one object identifies a number of items being processed by the resource associated with the object and a number of the items to be provided to the resource associated with the one or more virtual queues.

11. A method for allocating a plurality of resources among a plurality of tasks within a process system, the process system capable of executing at least one application process, the method comprising:
monitoring one or more characteristics associated with the at least one application process, the resources, and the tasks;
modeling the process system using a model to represent mathematically the resources and the tasks and to define relationships among related ones of the resources and the tasks as a function of the at least one application process;
operating the model in response to ones of the monitored characteristics to allocate ones of the resources among ones of the tasks to execute the at least one application process; and
generating a graphical user interface operable to identify (i) the resources and (ii) flows between at least some of the resources, the graphical user interface comprising at least one virtual queue associated with at least one of the resources and identifying one or more items to be processed by the at least one of the resources.

12. The method of claim 11, wherein:
the resources comprise one or more wet decks and one or more furnaces, the one or more furnaces comprising at least one vertical polysilicon furnace; and
one or more virtual queues are associated with the at least one vertical polysilicon furnace, the one or more items identified in the one or more virtual queues comprising a plurality of semiconductor wafer lots to be run through the at least one vertical polysilicon furnace.

13. The method of claim 12, wherein the one or more virtual queues identify a recipe associated with each semiconductor wafer lot, a number of semiconductor wafers in each semiconductor wafer lot, and a latest time when each semiconductor wafer lot should be provided to the at least one vertical polysilicon furnace.

14. The method of claim 13, further comprising opening one or more spreadsheets in response to user input, the one or more spreadsheets associated with the one or more virtual queues and comprising additional information about the semiconductor wafer lots.

15. The method of claim 12, wherein the graphical user interface comprises:
a first portion identifying at least two types of semiconductor wafers to be processed; and
a second portion identifying the one or more wet decks, one or more furnaces, and flows of semiconductor wafer lots between the one or more wet decks and the one or more furnaces, the second portion comprising the one or more virtual queues.

16. The method of claim 15, wherein the first portion comprises a plurality of buckets, each bucket associated with one type of item to be processed by the resources, each bucket identifying a plurality of time periods and a number of items to be processed during each of the time periods.

17. The method of claim 16, further comprising opening a spreadsheet associated with one of the buckets in response to user input, the spreadsheet comprising additional information about the items of the associated item type to be processed.

18. The method of claim 15, wherein the second portion comprises a plurality of objects, each object associated with one of the resources, at least two different types of resources associated with objects of different shapes.

19. The method of claim 18, wherein:
at least one object has at least one of an associated color and an associated shading that identifies a status of the resource associated with the object; and
at least one object identifies a number of items being processed by the resource associated with the object and a number of the items to be provided to the resource associated with the one or more virtual queues.

20. A computer program embodied on a computer readable medium and operable to be executed by a processor, the computer program comprising computer readable program code for generating a graphical user interface, the graphical user interface comprising:
a first portion identifying at least two types of semiconductor wafers to be processed by at least one of one or more wet decks and one or more furnaces, the one or more furnaces comprising at least one vertical polysilicon furnace; and
a second portion identifying the one or more wet decks, the one or more furnaces, and flows of semiconductor wafer lots between the one or more wet decks and the one or more furnaces;
the second portion comprising at least one virtual queue operable to identify one or more semiconductor wafer lots that have been scheduled to be processed by the at least one vertical polysilicon furnace.

21. The computer program of claim 20, wherein the at least one virtual queue identifies a recipe associated with each semiconductor wafer lot, a number of semiconductor wafers in each semiconductor wafer lot, and a latest time when each semiconductor wafer lot should be provided to the at least one vertical polysilicon furnace.

22. The computer program of claim 21, further comprising computer readable program code for providing at least one spreadsheet in response to user input, the at least one spreadsheet associated with the at least one virtual queue and comprising additional information about the semiconductor wafer lots.

23. The computer program of claim 20, wherein the first portion comprises a plurality of buckets, each bucket associated with one type of semiconductor wafer to be processed by the one or more wet decks and the one or more furnaces, each bucket identifying a plurality of time periods and a number of semiconductor wafers to be processed during each of the time periods.

24. The computer program of claim 23, further comprising computer readable program code for providing a spreadsheet associated with one of the buckets in response to user input, the spreadsheet comprising additional information about at least some of the semiconductor wafers to be processed.

25. The computer program of claim 20, wherein the second portion comprises a plurality of objects, each object associated with one of the wet decks or furnaces, wherein one or more objects associated with the one or more wet decks have a different shape than one or more objects associated with the one or more furnaces.

26. The computer program of claim 25, wherein:
at least one object has at least one of an associated color and an associated shading that identifies a status of the wet deck or furnace associated with the object; and
at least one object associated with at least one of the one or more furnaces identifies: (i) a number of semiconductor wafers being processed by the at least one furnace associated with the at least one object, and (ii) a number of those semiconductor wafers to be provided to the at least one vertical polysilicon furnace.

* * * * *